May 23, 1950 E. E. BARKSTROM ET AL 2,508,484
WINDING AND TALC APPLYING APPARATUS
Filed Sept. 9, 1947 5 Sheets-Sheet 1

INVENTORS
E. E. BARKSTROM
J. GURSKIS JR.
BY
ATTORNEY

May 23, 1950     E. E. BARKSTROM ET AL     2,508,484
WINDING AND TALC APPLYING APPARATUS
Filed Sept. 9, 1947     5 Sheets-Sheet 2

INVENTORS
E. E. BARKSTROM
J. GURSKIS JR.
BY
ATTORNEY

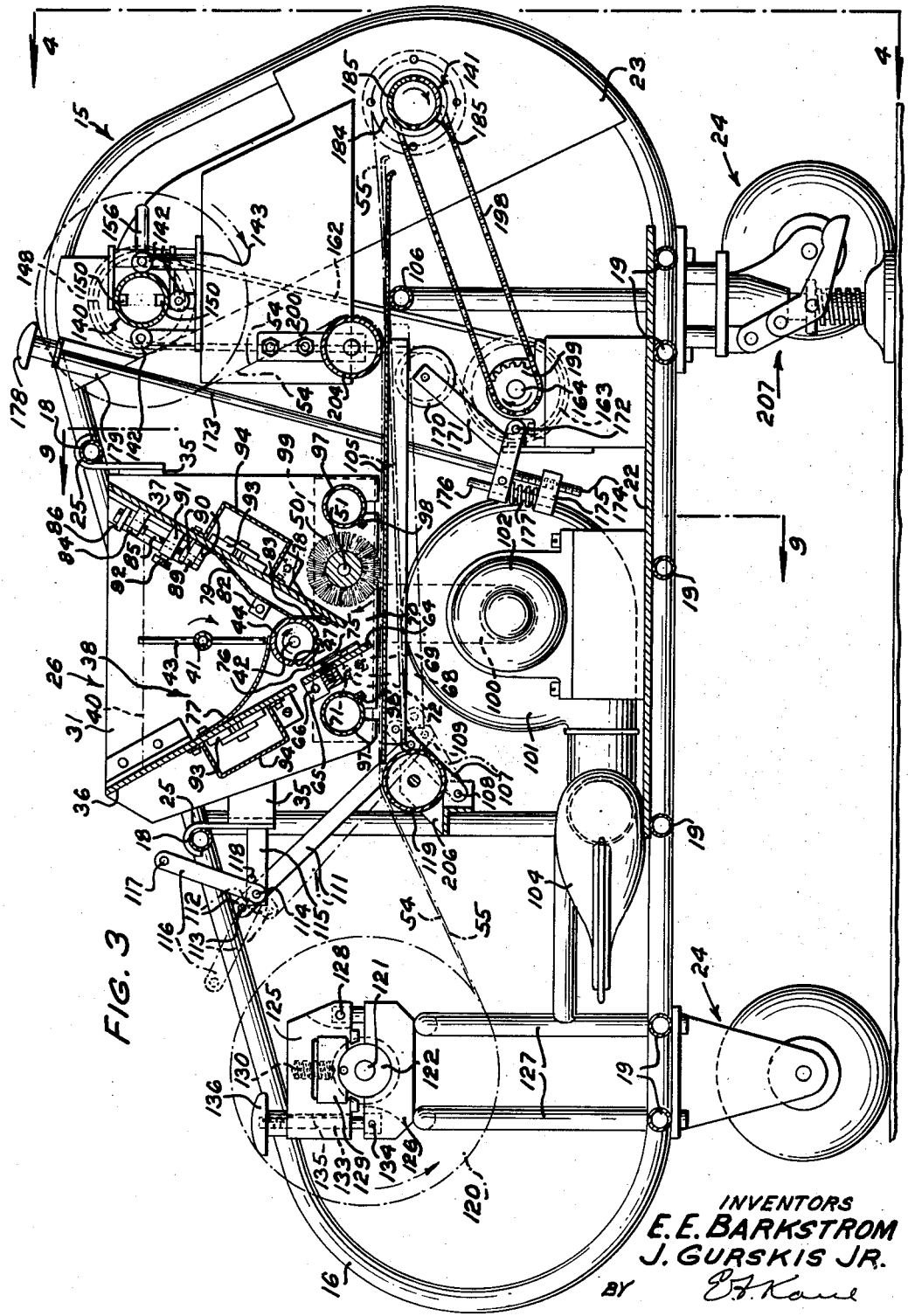

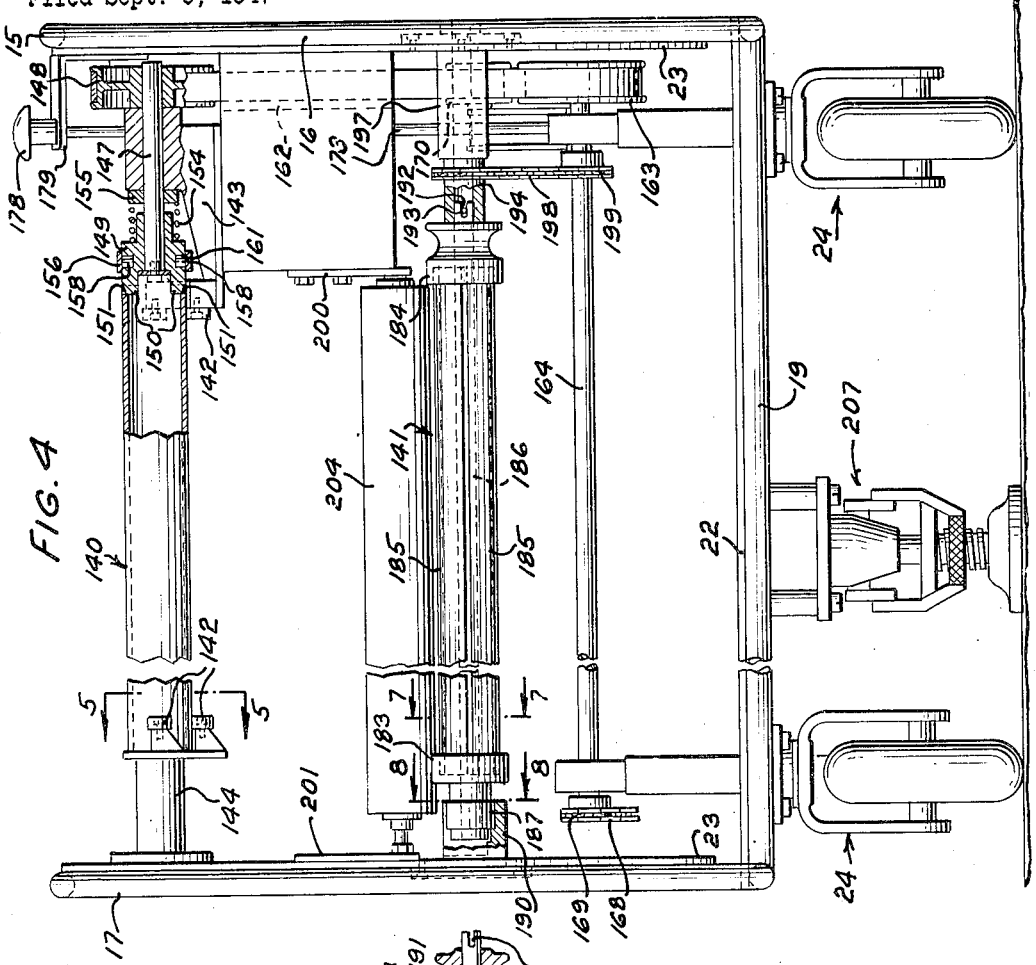

May 23, 1950   E. E. BARKSTROM ET AL   2,508,484
WINDING AND TALC APPLYING APPARATUS
Filed Sept. 9, 1947   5 Sheets-Sheet 5
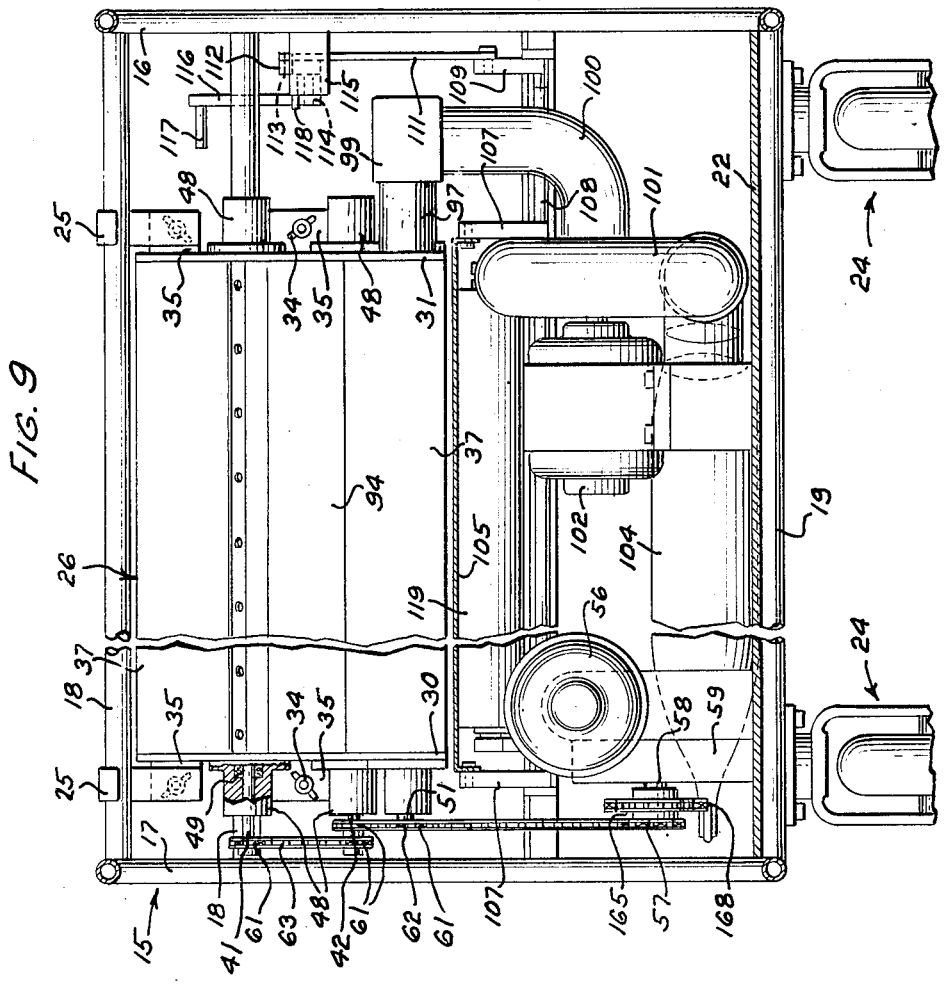
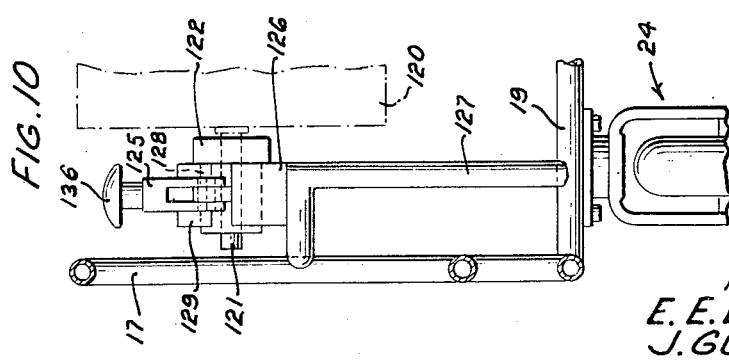
INVENTORS
E. E. BARKSTROM
J. GURSKIS JR.
BY  E. F. Kane
ATTORNEY Patented May 23, 1950

2,508,484

UNITED STATES PATENT OFFICE 2,508,484

WINDING AND TALC APPLYING APPARATUS

Elmer E. Barkstrom and Joseph Gurskis, Jr., Chicago, Ill., assignors to Western Electric Company, Incorporated, New York, N. Y., a corporation of New York Application September 9, 1947, Serial No. 773,050

8 Claims. (Cl. 242—55)

This invention relates to rewinding apparatus for applying granular material to tacky surfaces of strips and more particularly to a portable apparatus for applying talc to rubber strip during the rewinding thereof.

An object of the present invention is the provision of a simple, practicable and efficient apparatus for applying an adhesion inhibiting preparation to a tacky strip as the strip is wound into a roll.

In accordance with the above object, the present invention, in one embodiment thereof as applied to the rewinding of interwound rubber and cloth strips, comprises a wheeled framework for supporting a supply spool of interwound incompletely vulcanized rubber and cloth separator strips and carrying a mechanism for feeding and spreading talc on the upper surface of the rubber strip as it is drawn across an adjustable table and guided to a power driven take-up arbor, the cloth strip being separated from the rubber strip before the latter is taken up, and rewound on a second power drawn take-up arbor. The talc feeding and spreading mechanism includes a suction device for removing any excess talc delivered onto the rubber strip.

Other objects and advantages of this invention will more fully appear from the following detailed description, taken in conjunction with the accompanying drawings, in which Fig. 1 is a fragmentary plan view of a strip rewinding apparatus embodying the features of the invention;

Fig. 3 is a vertical longitudinal section, partly in elevation, taken on the line 3—3 of Fig. 1;

Fig. 4 is a fragmentary end view, partly in section, taken on the line 4—4 of Fig. 2;

Fig. 5 is an enlarged detail vertical section taken on the line 5—5 of Fig. 4;

Fig. 6 is a vertical longitudinal section, through a split arbor upon which the cloth strip is wound;

Fig. 7 is an enlarged detail vertical section taken on the line 7—7 of Fig. 4;

Fig. 8 is an enlarged detail vertical section taken on the line 8—8 of Fig. 4;

Fig. 9 is a fragmentary vertical section taken on the line 9—9 of Fig. 2 or Fig. 3; and Fig. 10 is a fragmentary vertical section taken on the line 10—10 of Fig. 2.

Figure 1:
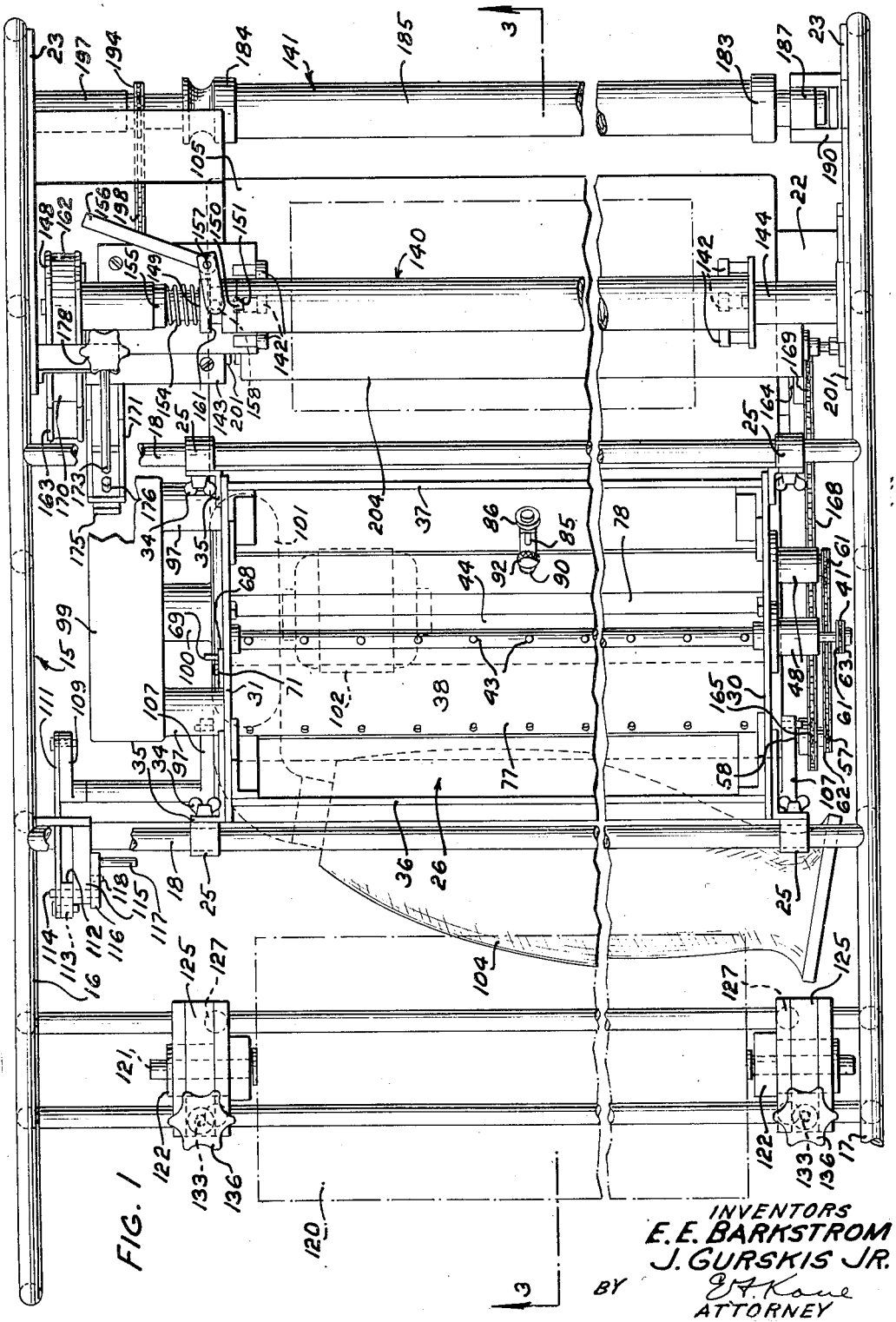
Figure 2:
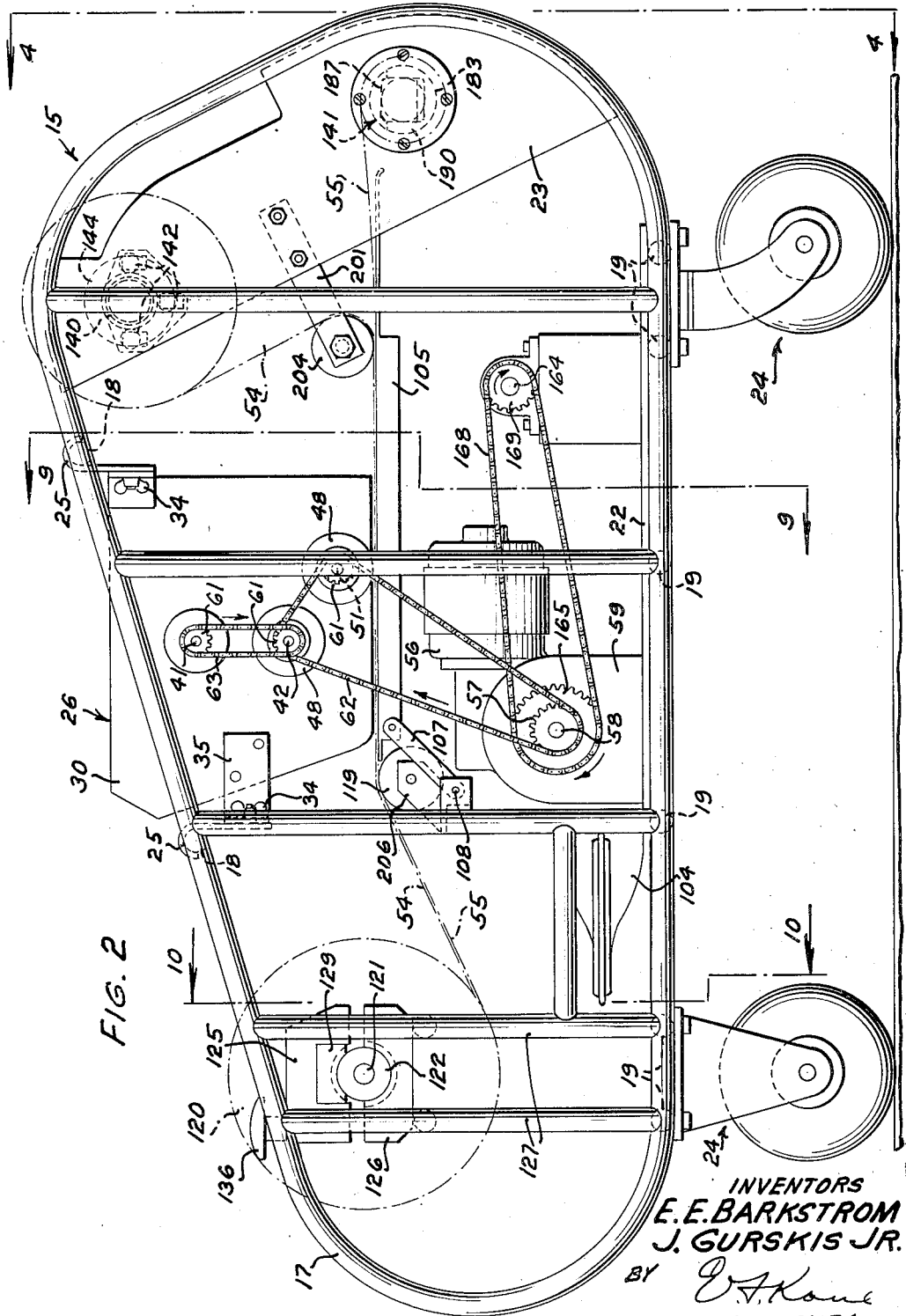
Fig. 2 is a view in side elevation of the apparatus.

Referring to the drawings in detail, and particularly to Figs. 1, 2 and 9, a metal framework is indicated at 15 comprising identical side frames 16 and 17 built of tubular members interconnected by a pair of upper tubular cross members 18 and six lower tubular cross members 19 suitably welded to the side frames. Spanning and welded to the side frames 16 and 17 and also to a plurality of the cross members 19 is a floor plate 22. At their right hand ends (Fig. 3), the side frames 16 and 17 are reinforced by irregular shaped plates 23 welded thereto. The framework 15 is mounted upon four swivel wheel assemblages 24, two at each end, whereby the apparatus may be shifted readily in any direction upon the floor.

Suspended from the cross members 18, by means of hooks 25, is a talc feeding and spreading mechanism, indicated in general at 26. The mechanism 26 includes a framework comprising opposite irregularly shaped end walls 30 and 31 secured to the hooks 25 by thumb screws 34 and brackets 35 attached to the end walls (Fig. 2). Extending between the and attached to the end walls 30 and 31 are oppositely inclined walls 36 and 37 forming, in the main, with the framework end walls 30 and 31, a hopper 38 for holding a supply of talc, the level of which in the hopper is indicated by the broken line 40 (Fig. 3). It will be apparent that the hopper walls 36 and 37 serve to tie the framework end walls 30 and 31 firmly together.

Mounted within the hopper 38 and attached to horizontal shafts 41 and 42 (Figs. 2 and 3), which extend through the framework end walls 30 and 31 is a multi-bladed agitator 43 and a hollow feed drum 44, respectively, arranged in vertical alignment. The feed drum 44 is provided with a plurality of equally spaced longitudinally extending peripheral grooves 47, the purpose of which will be made apparent hereinafter, and the end surfaces of the agitator 43 and drum 44 snugly bear upon the opposed inner surfaces of the framework end walls 30 and 31. The shafts 41 and 42 are similarly journalled at their opposite ends in bearing boxes 48 attached to the outer surfaces of the end walls 30 and 31 and provided with suitable means, indicated at 49 (Fig. 9), carried in the boxes and surrounding the shafts to provide seals to prevent the talc in the hopper 38 from passing along the shafts into the bearing boxes.

Also mounted within the hopper 38 at the right side of the shafts 41 and 42 (Fig. 3), in a manner similar to that described for the agitator 43 and feed drum 44, is a rotary brush 50 provided with soft bristles fixed to a shaft 51. The brush 50 serves to evenly spread the talc dropped intermittently from the grooves 47 of the feed drum 44 onto the upper surface of a moving rubber strip 54 (Fig. 3) travelling in unison with a cloth strip 55 below the hopper 38, in the operation of the apparatus, so that after the rubber and cloth strips advance from the brush, the rubber strip has a layer of talc spread evenly upon its upper surface. The thickness of the rubber strip 54 is several times that of the cloth strip 55, the latter serving as a separator for the convolutions of the rubber strip, which is somewhat tacky and thus prevents adherence between the convolutions of rubber while interwound with the cloth strip. The application of talc to the rubber strip 55 also serves to prevent adherence between the convolutions of rubber after it is separated from the cloth strip and rewound in a manner to be presently described. The agitator 43, feed drum 44 and brush 50, in the operation of the apparatus, are each simultaneously driven in a clockwise direction and at substantially the same speed by the following mechanism. Secured to the floor plate 22 of the portable framework 15 is a suitable electric motor 56, the shaft of which is operatively connected to a sprocket wheel 57 through an output shaft 58 of a gear reduction unit 59, also mounted on the floor plate. Each of the shafts 42 and 51 has fixed thereto a sprocket pinion 61, driven from the sprocket wheel 57 by an endless sprocket chain 62 associated with the sprocket wheel 57, as clearly shown in Fig. 2. Also carried by the shaft 42 is a second sprocket pinion 61 and the shaft 41 also carries a sprocket pinion 61, the latter two sprocket pinions being operatively connected by an endless sprocket chain 63. The sprocket pinions 61 are all similar so that each of the shafts 41, 42 and 51 are driven at substantially the same speed.

Associated with and extending along the entire length of the inclined hopper wall 36 is a pivotally adjustable hopper wall 64 (Fig. 3), which has an angular extension 65 at each end, which is pivoted by means of an attached rod 66 to the framework walls 30 and 31. One of the rods 66 extends beyond the outer surface of the framework wall 31 and secured to such rod is a lever 68 carrying a hand grip 69, whereby the adjustable hopper wall 64 shown in a plane coinciding with that of the hopper wall 36 in Fig. 2 may be rocked in either direction to enlarge or narrow the outlet space indicated at 70 of the hopper 38 provided at the lower ends of the spaced walls 37 and 64. When suitably adjusted, the hopper wall 64 is retained in position by tightening a clamping bolt 71 fixed to the end wall 31 and extending into a slot 72 provided in the lever 68. Hinged to the adjustable hopper wall 64 at 75 is a spring-pressed scraper blade 76, which, at its upper end, is arranged to constantly bear against the peripheral surface of the feed drum 44 along its entire length and, in the operation of the apparatus, rides into and out of the longitudinal grooves 47 and is effective to remove from the grooves and the peripheral surface of the feed drum any talc which does not drop therefrom through the outlet space 70 onto the moving rubber strip 54.

Attached at its upper end portion to the hopper wall 36 and extending along its entire length is an arc-shaped spring plate 77 having its lower end portion constantly bearing at its lower surface upon the periphery of the feed drum 44 under a suitable pressure. The plate 77 serves to seal off the left hand side of the hopper 38 from the hopper outlet space 70. Slidable along its opposite side portions upon the hopper wall 37 and extending along its entire length is a spring plate 78 having a portion 79 thereof intermediate the side portions, which is raised out of the plane of the wall 37. The portion 79 bears under suitable pressure against fixed slide plates 82 attached to the framework end walls 30 and 31. A portion 83 of the plate 78, as shown in the drawings, when the mechanism is set up for delivering talc from the hopper 38 to the rubber strip 54 solely by means of the grooves 47 of the feed drum 44, bears against the periphery of the feed drum and this serves to limit the amount of talc delivered during each complete rotation of the feed drum to the amount of talc carried in the grooves 47, the talc being intermittently dropped onto the moving rubber strip 54. When it is desired to feed a greater amount of talc to the rubber strip 54, the plate 78 is moved upwardly upon the hopper wall 37 to move the portion 83 of the plate from engagement with the periphery of the feed drum 44 and thus providing a space therebetween with the result that a continuous feed of the talc will be delivered to the strip of rubber 54. In order to slide the plate 78 upwardly or downwardly to vary the amount of talc delivered from the hopper 38, the following mechanism is provided.

Fixed to the hopper wall 37 is an apertured screw-threaded bearing block 84, through which extends one end of a screw-threaded rod 85 equipped with a hand grip 86 for rotating it, the opposite end of the rod being freely rotatable in a bearing block 89 attached to the plate 78. Pinned to the rod 85 at opposite sides of the block 89 are collars 90. Secured to the hopper wall 37, between the bearing blocks 84 and 89, is a block 91, through which the rod 85 freely extends, the block carrying a clamping screw 92, whereby, after an adjustment of the plate 78 by a rotation of the rod 85, it may be retained in its adjusted position.

For the purpose of maintaining the talc in the hopper 38 dry and thus freely flowing during its feed to the moving rubber strip 54, the opposite inclined walls 36 and 37 of the hopper 38 are equipped with suitable electrical resistance heaters 93, which serve to heat the walls and, in turn, the talc, the heaters being enclosed in housings 94.

The talc feeding and spreading mechanism 26 includes a talc suction device for removing any excess talc delivered for any reason to the rubber strip 54 comprising the following: Extending between the end walls 30 and 31, arranged outside of the inclined hopper walls 36 and 37 adjacent the bottom of the hopper 38 and above the path of the rubber strip 54 are two suction tubes 97 each having a plurality of nipples 98 extending therefrom provided with restricted orifices. At their right hand ends, as viewed in Fig. 9, the tubes 97 extend through the end wall 31 and are connected to a manifold 99. The manifold 99 communicates, by means of piping 100, with the inlet of a suction motor 101 supported on the floor plate 22. An electric motor 102, carried on the floor plate 22, drives the suction motor 101. To the outlet of the suction motor 101 is removably attached a fabric suction bag 104, which rests upon the floor plate 22. In the operation of the apparatus, any excess talc delivered to the rubber strip 54 is sucked up by the nipples 98 and deposited in the bag 104.

Arranged below the hopper 38 is a pivotally adjustable table 105, upon which the rubber and cloth strips 54 and 55, respectively, travel in the operation of the apparatus. The table 105 is pivoted or fulcrumed adjacent its right hand end by freely resting upon a tubular member 106 (Fig. 3) attached to and extending between the side frames 16 and 17. At its left hand end, the table 105 is pivotally connected to a pair of links 107, which have their opposite ends attached to a rod 108 pivoted at opposite ends on the side frames 16 and 17. The right hand end of the rod 108 (Fig. 9) has fixed thereto a lever 109 (Fig. 1), to the outer end of which is pivoted one end of a link 111, having its opposite end pivotally connected to a lever 112, as indicated at 113 (Figs. 1 and 3), fixed to a rod 114 journalled in a bearing bracket 115 carried on the side frame 16. Fixed to the rod 114 is a hand operable lever 116 carrying a hand grip 117. In the full line position of this lever and link mechanism (Fig. 3), the table 105 will be maintained in a horizontal operating position, as shown, with the hand lever 116 engaging a stop pin 118 fixed to the bracket 115. Upon the hand lever 116 being rocked in a counter-clockwise direction (Fig. 3) to the broken outline position, the left hand end of the table 105 will be lowered to the broken outline position, the opposite end of the table fulcruming on the tubular rest member 106. In this latter position of the table 105, it will be apparent that the rubber and cloth strips 54 and 55, respectively, may be readily passed over a guide sheave 119 mounted on suitable brackets attached to the side frames 16 and 17 and across the table 105 when the apparatus is being set up for operation.

The frame 15, at its left-hand end, supports a supply spool 120 of interwound rubber and cloth strips 54 and 55, respectively, the spool being fixed to an arbor or shaft 121, to opposite ends of which are attached annular shouldered bushings 122, which are journalled in sets of hinged split journals 125 and 126. Each of the lower journals 126 is fixed to a framework 127 attached to the frame 15 and the upper journal 125 is hinged, as indicated at 128, to the lower journal. A shoe 129 is mounted for vertical movement on the hinged journal 125 with a coiled compression spring 130 interposed between the shoe and bushing 122 whereby a sufficient and desired braking pressure is normally exerted on the shouldered bushings 122 attached to the shaft 121, to which shaft the supply spool 120 is fixed. The split journals 125 and 126 are normally maintained closed, as shown in Fig. 3, by means of a hinged rod 133 pivoted at 134 to the lower fixed journal 126 and extending through a notch 135 provided in the upper hinged journal 125. At its upper end, the rod 133 is screw-threaded for receiving thereon a hand wheel 136, which is turned down to maintain the supply spool 120 in its normal position relative to the split journals (Fig. 3). To remove an empty spool 120 from the apparatus, the hand wheels 126 are turned upwardly upon the rods 133, after which the rods may be swung counterclockwise about their pivots 134 and the upper hinged journal 125 swung clockwise about their pivots 128 to open the split journals, whereupon the bushings 122, shaft 121, and spool 120 will be freed for removal from the apparatus.

In the operation of the apparatus, the rubber and cloth strips 54 and 55, respectively, are separated after talc is applied to the upper surface of the rubber strip and thereafter each strip is wound upon arbors indicated in general at 140 and 141, respectively. The arbor 140 is mounted for rotation at opposite ends upon sets of three rollers 142 carried upon bearing brackets 143 and 144 attached to the side frames 16 and 17, respectively. Journalled in the bearing bracket 143 is a shaft 147, to which is fixed at one end a pulley 148 and to the opposite end of the shaft is suitably keyed for rotation therewith, but slidable longitudinally thereon, a clutch member 149 having projecting from its left end face (Fig. 4) a pair of diametrically opposed clutch teeth 150, which are enterable into suitable notches 151 formed in the right end face of the arbor 140. A compression spring 154 surrounding a reduced portion of the clutch member 149 and bearing at opposite ends against annular faces of the clutch member and a collar 155 surrounding the shaft 147 is effective to maintain the clutch teeth 150 in normal operative relation in the notches 151 of the arbor 140. The clutch member 149 is shifted from driving relation with the arbor 140 by means of a hand lever 156 pivoted at 157 upon the bearing bracket 143, the lever carrying a pair of pins 158 which ride in an annular peripheral channel 161 in the clutch member 149. As viewed in Fig. 1, the clutch member 149 is operatively engaged with the arbor 140 for driving the same. When it is desired to remove the arbor 140 with the rubber strip wound thereon from its supporting sets of rollers 142, the hand lever 156 is rocked clockwise about its pivot 157 (Fig. 1), during which the clutch member 149 will be shifted upwardly, as viewed in Fig. 1, to withdraw the clutch teeth 150 from operative engagement in the notches 151 in the arbor, whereupon the arbor is free to be lifted off the sets of rollers.

The pulley 148, which drives the arbor 140, receives motion from a belt 162 driven by a pulley 163 fixed to a shaft 164 suitably journalled and supported from the floor plate 22. For driving the shaft 164, a sprocket wheel 165 is fixed to the output shaft 58 of the gear reduction unit 59 and a sprocket chain 168 interconnects the sprocket wheel 165 and a sprocket wheel 169 fixed to the shaft 164 (Fig. 2). Since the diameter of the wound rubber strip 54 on the takeup arbor 140 increases during the winding operation, the belt 162 is arranged to slip on the pulley 148 and to travel under an idler pulley 170, which serves as a belt tightener. The idler pulley 170 is rotatably mounted on one arm of a bell crank lever 171, pivoted at 172. In order to adjust the position of the idler pulley 170 to provide a desired pressure against the belt 162, another arm of the lever 171, which is forked at its outer end, has a rotatable rod 173 screw-threaded at its lower end, and extending freely between the bifurcations of the lever arm and threaded onto such end of the rod is an irregular-shaped nut 175, to which is fixed a vertically extending rod 176, which also extends freely between the furcations of the lever arm. Surrounding the rod 176 is a compression spring 177 having its opposite ends engaging opposed surfaces of the nut 175 and the furcations of the lever arm. Fixed to the upper end of the rotatable rod 173 is a hand grip 178, through the manipulation of which the idler pulley 170 may be shifted to vary the tightness of the belt 162, the latter end of the rod being journalled in a bearing 179 fixed to the reinforcing plate 23. It will be apparent that through the spring 177 a yieldable pressure is constantly exerted on the belt 162.

The arbor 141, upon which the cloth strip 55 is taken up, is of the split collapsible type (Figs. 4, 6, 7 and 8), comprising opposite head members 183 and 184 shaped internally to support and center two similar members 185 when fully assembled, as shown in Fig. 6. Extending through the head members 183 and 184 is a center core member 186 supporting at its left end a rectangular-shaped journal 187 freely fitted to the core member and adapted to nest in an open top journal block 190 supported on the side frame 17 (Figs. 4 and 8). The right end of the core member 186 is normally fixed to the head member 184 by a set screw 191, which serves to hold the collapsible arbor 141 assembled. When it is desired to collapse the arbor 141 to remove the wound cloth strip 55, the set screw 191 is loosened and the head 184 slid off the core member 186, whereupon the members 185 will be free of the cloth 55 wound thereon. At its extreme right end (Figs. 4 and 6), the core member 186 has a diametrical notch 192 which, as shown in Fig. 4, is operatively engaged with a pin 193 extending diametrically across a hub portion of a sprocket wheel 194, the shaft for which is journalled in a bearing 197 fixed to the side frame 16. It will be understood that the notched end of the core member 186 is supported in the hub portion of the sprocket wheel 194 with its end face against the opposed end face of the shaft for the sprocket wheel 194. The sprocket wheel 194, which drives the arbor 141, is driven by a sprocket chain 198 receiving motion from a sprocket wheel 199 fixed to the shaft 164. Therefore, while the arbor 141 is driven at a constant speed, the linear speed of the cloth will increase in direct proportion to the outside diameter of the wound cloth roll. It will be understood that sufficient braking pressure on the supply spool 120 in a manner previously described will provide suitable tensions on the rubber and cloth strips 54 and 55, respectively, during rewinding with the lesser tension on the rubber strip, thus insuring that the speed of the cloth strip will be the linear speed of the rewinding operations. To remove the arbor 141 wound with the cloth strip 55 from the apparatus, the left end of the arbor is raised from the journal block 190 (Fig. 4) and tilted sufficiently to permit the right end of the notched core member 186 being disengaged from the pin 193 carried by the hub portion of the sprocket wheel 194.

Suitably journalled in brackets 200 and 201 attached to the side frames 16 and 17, respectively, is a guide roller 204, around which the rubber strip 54 is guided and thence to the take-up arbor 140, the rubber and cloth strips 54 and 55, respectively, being separated at this point. Between the supply spool 120 of interwound rubber and cloth strips 54 and 55, respectively, and the left end of the table 105, is the guide roller 119 journalled in similar brackets 206 attached to the side frames 16 and 17, the brackets also serving as supports for the pivotal rod 108 associated with the means for lowering the table 105 when the rubber and cloth strips are being threaded through the apparatus.

For the purpose of maintaining the portable strip rewinding apparatus stationary after being wheeled to its operating position, one end of the apparatus is equipped with an attached well-known type of treadle actuated jack, indicated in general at 207 (Figs. 3 and 4), whereby such end of the apparatus may be elevated and thus the two adjacent swivel wheel assemblages 24 will be raised from the floor.

In the operation of the portable apparatus above described, the interwound rubber and cloth strips 54 and 55, respectively, with the rubber strip uppermost, are withdrawn from the supply spool 120 and guided over the roller 119 and onto the table 105 by the combined action of the takeup arbors 140 and 141, respectively, and particularly the latter positively driven arbor in the manner previously described, the strips being separated at the point where the rubber strip is trained around the guide roller 204 and led to the arbor 140. As the travelling strips pass under the talc feeding and spreading mechanism 26, the agitator 43, feed wheel 44 and brush 50 will be effective to feed and spread an even layer of talc from the hopper 38 through the adjustable outlet space 70 onto the upper surface of the advancing rubber strip 54. Any excess of talc deposited for any reason on the rubber strip 54 at the left side of the outlet (Fig. 3) or the right side of the brush 50 will be drawn from the rubber strip by the nipples 98 of the air suction tubes 97 and delivered to the suction bag 104.

What is claimed is:

1. An apparatus for individually rewinding a pair of interwound strips from a supply spool on separate takeup arbors comprising a pair of rotatably driven takeup arbors upon which the strips are individually rewound, a table upon which the strips are advanced from the supply spool by said rotatably driven arbors, guide means mounted above the plane of travel of said strips on said table for effecting a separation of the strips and guiding one strip to its arbor, the other strip advancing from the table to its arbor, means for driving said arbors at proportional speeds, and a framework for supporting the supply spool, said arbors, table, guide means and arbor driving means.

2. An apparatus for individually rewinding a pair of interwound strips from a supply spool on separate takeup arbors comprising a pair of rotatably driven takeup arbors upon which the strips are individually rewound, an adjustable normally horizontal table upon which the strips are advanced from the supply spool by said rotatably driven arbors, means for supporting one end of said table, guide means mounted above the plane of travel of said strips on said table for effecting a separation of the strips and guiding one strip to its arbor, the other strip advancing from the table to its arbor, means for driving said arbors at proportional speeds, a hand actuated lever and link mechanism operatively connected to the opposite end of said table for adjusting said table when setting up the apparatus for operation, and a framework for supporting the supply spool, said arbors, table, table supporting means, guide means, arbor driving means and lever and link mechanism.

3. An apparatus for individually rewinding interwound strips from a supply spool on separate takeup arbors, one of said strips being tacky, comprising an arbor for supporting a roll of tacky material interwound with a strip of separator material, a pair of rotatably driven takeup arbors upon which the strips are individually rewound, a table upon which the strips are advanced with the tacky strip uppermost from the supply spool by said rotatably driven arbors, guide means mounted above the plane of travel of said strips on said table for effecting a separation of the strips and guiding the tacky strip to its arbor, the other strip advancing from the table to its arbor, means mounted above said table and in advance of said guide means for applying talc onto the upper tacky advancing strip, means for driving said takeup arbors at proportional speeds, and a framework for supporting the supply spool, said arbors, table, guide means, talc applying means, and arbor driving means.

4. An apparatus for individually rewinding interwound strips from a supply spool on separate takeup arbors, one of said strips being tacky, comprising an arbor for supporting a roll of tacky material interwound with a strip of separator material, a pair of rotatably driven takeup arbors upon which the strips are individually rewound, an adjustable normally horizontal table upon which the strips are advanced from the supply spool by said rotatably driven arbors, means for supporting one end of said table, a guide roller mounted above the plane of travel of said strips on said table for effecting a separation of the strips and guiding one strip to its arbor, the other strip advancing from the table to its arbor, a slip drive mechanism for permitting said arbor upon which the tacky strip of material is rewound to be driven at a greater speed as the diameter of the rewound material increases, a drive mechanism for driving said arbor upon which the separator strip is wound at a constant speed, a hand actuated lever and link mechanism operatively connected to the opposite end of said table for adjusting said table when setting up the apparatus for operation, and a portable wheeled framework for supporting the supply spool, table supporting means, said arbors, table guide roller, arbor driving mechanism, and lever and link mechanism.

5. In an apparatus for separating a tacky strip material from a strip of separator material and winding the tacky material, an arbor for supporting a supply roll of tacky material and interwound separator material, a positively driven arbor for withdrawing the separator material from the supply, a slip driven arbor for taking up the tacky material, a spreader for feeding a supply of adhesive inhibiting granular material to a surface of the tacky material as it passes from the supply roll to the slip driven arbor, a tiltable table for guiding the tacky strip past said spreader, and an adjustable support for said table whereby said table may be moved away from the spreader to permit loading of the apparatus.

6. In an apparatus for separating a tacky strip material from a strip of separator material and winding the tacky material, an arbor for supporting a supply roll of tacky material and interwound separator material, a positively driven arbor for withdrawing the separator material from the supply, a slip driven arbor for taking up the tacky material, a spreader for feeding a supply of adhesive inhibiting granular material to a surface of the tacky material as it passes from the supply roll to the slip driven arbor, a tiltable table for guiding the tacky strip past said spreader, an adjustable support for said table whereby said table may be moved away from the spreader to permit loading of the apparatus, a framework for supporting said spreader, table and arbors, and means extending from said table support to a point outside said framework for effecting adjustment of said table support.

7. In an apparatus for separating a tacky strip material from a strip of separator material and rewinding the strip materials, an arbor for supporting a supply roll of tacky material and interwound separator material, a pair of rotatably driven takeup arbors upon which the strips are individually rewound, a tiltable table upon which the strips are advanced from the supply roll by said rotatably driven arbors, a spreader for feeding a supply of adhesive inhibiting granular material to a surface of the tacky material as it advances from the supply roll to its arbor, a rest for supporting one end of said table, an adjustable support operatively connected to the opposite end of said table whereby said table may be tilted upon said rest away from the spreader to permit loading of the apparatus, and means for driving said takeup arbors at proportional speeds.

8. In an apparatus for separating a tacky strip material from a strip of separator material and rewinding the strip materials, an arbor for supporting a supply roll of tacky material and interwound separator material, a pair of rotatably driven takeup arbors upon which the strips are individually rewound, a tiltable table upon which the strips are advanced with the tacky strip uppermost from the supply roll by said rotatably driven arbors, a spreader for feeding a supply of adhesive inhibiting granular material to a surface of the tacky material as it advances from the supply roll to its arbor, guide means mounted above the plane of travel of said strip on said table for effecting a separation of the strips and guiding the tacky strip to its arbor, a rest for supporting one end of said table, an adjustable support operatively connected to the opposite end of said table whereby said table may be tilted upon said rest away from the spreader to permit loading of the apparatus, and means for driving said takeup arbors at proportional speeds.

ELMER E. BARKSTROM.
JOSEPH GURSKIS, Jr.

REFERENCES CITED

The following references are of record in the file of this patent:

UNITED STATES PATENTS

| Number | Name | Date |
|---|---|---|
| 1,008,993 | Seward | Nov. 14, 1911 |
| 1,788,564 | Daniel | Jan. 13, 1931 |
| 1,800,182 | Kirk | Apr. 7, 1931 |